May 5, 1970   T. W. STONE ET AL   3,510,707
MOTOR AND METHOD OF ASSEMBLING
Filed July 27, 1966   2 Sheets-Sheet 1
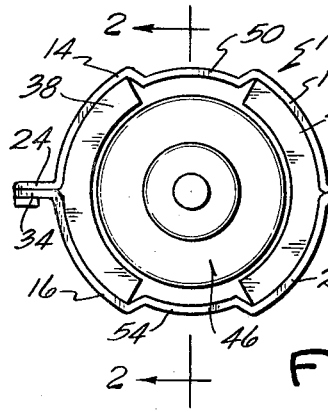
FIG. 1
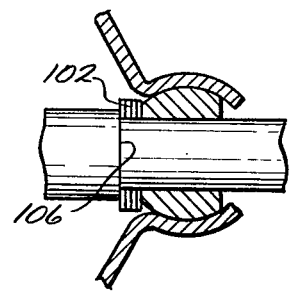
FIG. 6
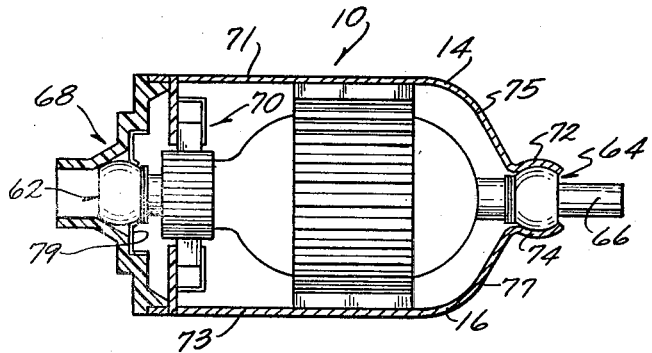
FIG. 2
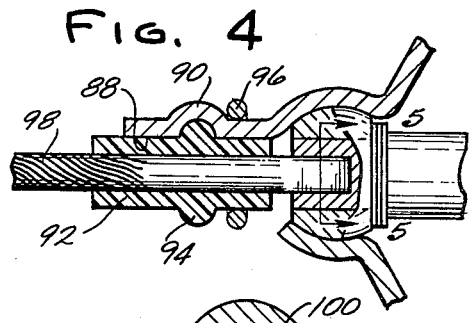
FIG. 4
FIG. 5
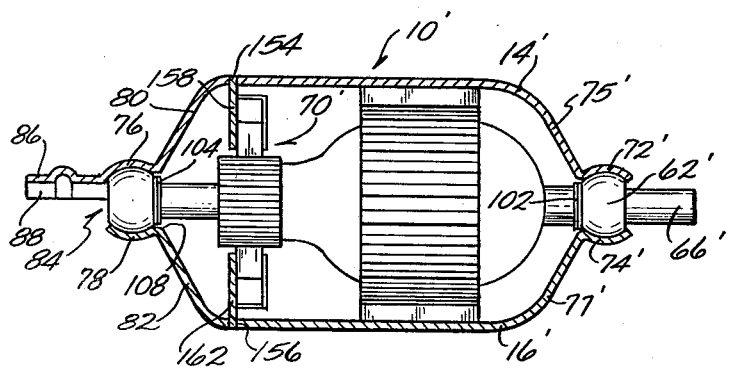
FIG. 3
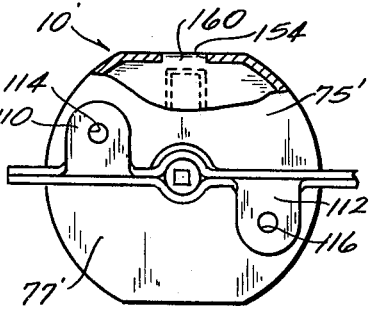
FIG. 7
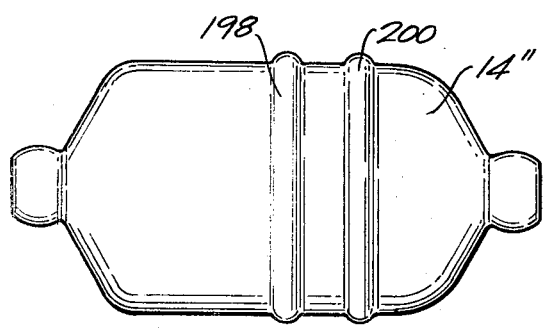
FIG. 13
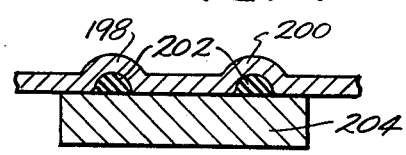
FIG. 14
INVENTORS
THOMAS W. STONE
EDWARD LATTA
By Joseph A. Gemignani
ATTORNEY May 5, 1970 T. W. STONE ET AL 3,510,707
MOTOR AND METHOD OF ASSEMBLING
Filed July 27, 1966
2 Sheets-Sheet 2
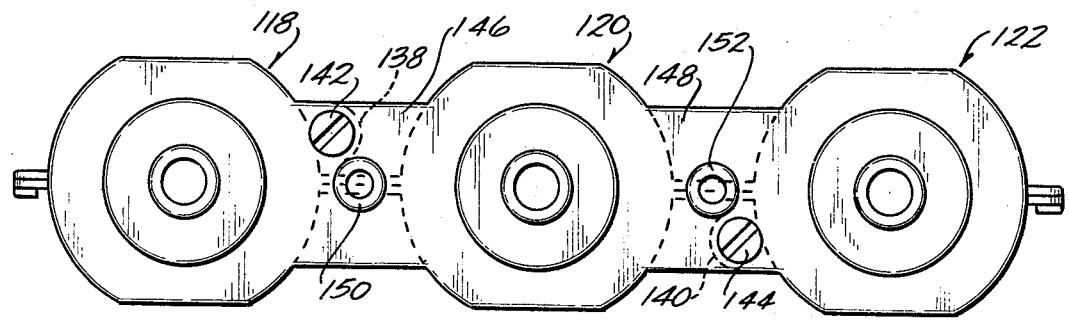
FIG. 11
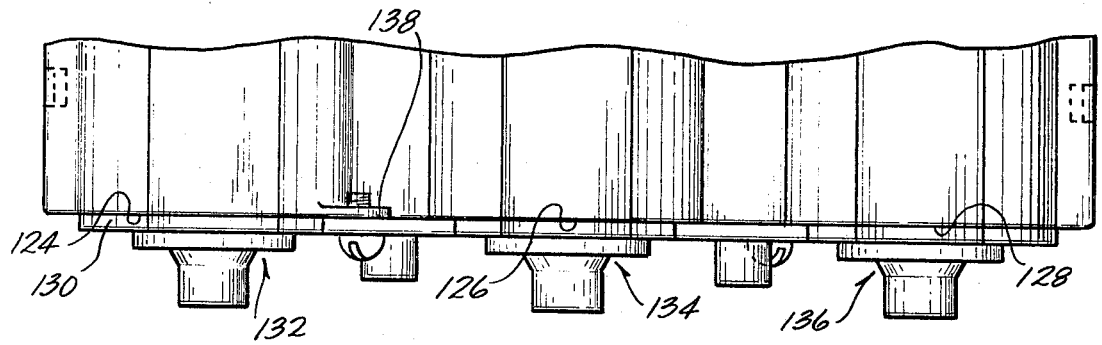
FIG. 12
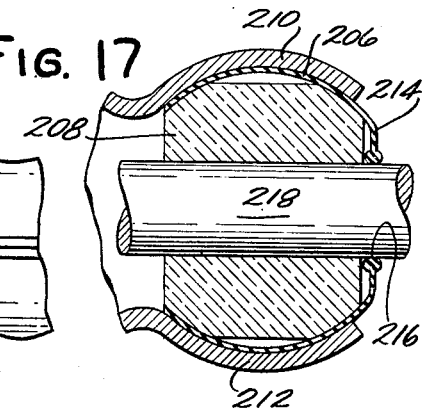
FIG. 17
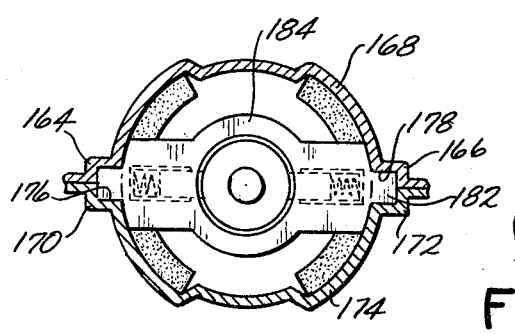
FIG. 15  FIG. 16  FIG. 10
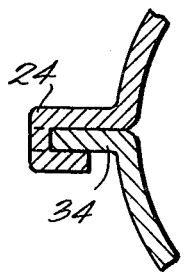
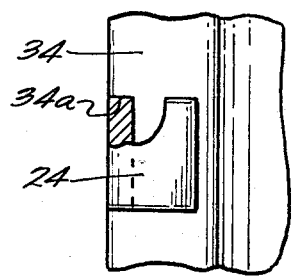
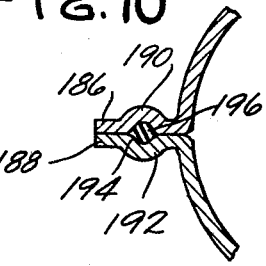
FIG. 8  FIG. 9
INVENTORS
THOMAS W. STONE
EDWARD LATTA
By Joseph A. Gemignani
ATTORNEY

United States Patent Office 3,510,707
Patented May 5, 1970

3,510,707
MOTOR AND METHOD OF ASSEMBLING
Thomas W. Stone and Edward Latta, Owosso, Mich., assignors to Controls Company of America, Melrose Park, Ill., a corporation of Delaware
Filed July 27, 1966, Ser. No. 568,200
Int. Cl. H02k 7/20, 21/10
U.S. Cl. 310—112                    3 Claims

ABSTRACT OF THE DISCLOSURE

A gang motor is made up of two shell sections each having a plurality of arcuate portions in confronting relationship with arcuate portions on the other to thereby form armature receiving openings. Magnets are supported at each opening between offsets in the arcuate portions. An armature assembly is suppported in each opening by bearing retaining portions integrally formed with end portions of the shell sections, which end portions are an integral part of the shell sections. The gang motor can also include integrally formed mounting tabs at one end of the joined shell sections, flexible shaft attachments integral with the bearing retaining portions, a common end plate closing a common end of a number of armature receiving openings and connected in the gang motor through mounting tabs integral with the shell sections, and a resilient insert between the armature assembly bearings and their respective bearing retaining portions.

---

This invention relates to gang mounted electric motors of the type utilizing two identical or similarly shaped shell halves connected together to form the motor shells of a number of motors in the same integral assembly or, more generally, to electric motors of the type utilizing two identical or similarly formed shell halves which are connected together to form the motor shell.

This invention relates specifically to improvements on the basic motor shell construction disclosed and claimed in the co-pending application of Edward Latta and Edmund J. Godin, filed Feb. 10, 1966, Ser. No. 526,558, and assigned to the assignee of this application. The aforementioned co-pending application relates to a basic construction for the outer shell of an electric motor. That motor shell construction afforded a substantial reduction in fabrication costs and simplification of assembly techniques with respect to the motor per se, and also afforded a marked simplification and reduction in cost of the particular installation utilizing such a motor. As a result of the development of that motor shell construction and the fabricating techniques introduced by that construction, still further simplifications and improvements evolved which resulted in greater versatility and wider possible applications for such motor constructions.

General objects of this invention are:
(1) To render overall motor assemblies of the type more compact;
(2) Where the motor is of the permanent magnet type, to simplify the attachment of the field generating magnets in the field assembly;
(3) To provide a simplified bearing retainer arrangement for the armature shaft bearings, and also a bearing retainer arrangement which accommodates tolerance variations in either the bearing or the retainer;
(4) To simplify the brush card attachment in the motor assembly;
(5) To increase the selection of possible output connections which can be made to the motor shaft, specifically to permit ready and facile attachment of a flexible shaft to the motor shaft;
(6) To simplify connection of the shell halves;
(7) To increase the versatility of the motor structure with regard to possible mountings that can be used for the motor as well as permitting a wider selection of possible attachments of auxiliary drives to the motor;
(8) To permit more facile sealing of the motor shell; and
(9) To provide an overall motor construction which permits simplified and effective armature assembly and, further, which permits ready adjustment of the armature assembly to eliminate armature end play.

The construction and arrangements for achieving these and other objects and advantages will be pointed out in, or be apparent from, the specification and claims, as will obvious modifications of the embodiments shown in the drawings, in which:

FIG. 1 is an end view of a gang motor assembly including shells constructed in accordance with this invention and having the end plates removed;

FIG. 2 is an axial section view taken through one motor section and generally along line 2—2 of FIG. 1, but with a separate end plate attached;

FIG. 3 is an axial section of an alternative motor shell construction through one motor section of a gang motor assembly to illustrate a motor shell construction which does not require a separate end plate;

FIG. 4 is an enlarged view of one end of the motor shell of FIG. 3;

FIG. 5 is a section view along line 5—5 of FIG. 4;

FIG. 6 is an enlarged view of the other end of the motor shell of FIG. 3;

FIG. 7 is an end view of the motor sections of FIG. 3;

FIG. 8 is an enlarged view of a portion of FIGS. 1, 3 or 7;

FIG. 9 is a top plan view of FIG. 8;

FIG. 10 is an enlarged view of an alternative construction and illustrating a method of sealing the connection between the shell halves;

FIG. 11 is an end view of an alternative form of this invention wherein a common end plate is used to connect a number of motor shells of a gang motor assembly;

FIG. 12 is a plan view of the arrangement of FIG. 11;

FIG. 13 illustrates an alternative arrangement for attaching the magnets in the motor shell;

FIG. 14 is a partial section view along line 14—14 of FIG. 13;

FIG. 15 illustrates an alternative brush card attachment;

FIG. 16 is a side view of the brush attachment of FIG. 15; and

FIG. 17 illustrates an alternative bearing retainer construction utilizing a bearing adapter and shaft seal number.

With particular reference to the drawings, the outer shells of two motor sections 10 and 12 of a gange motor assembly are illustrated as being formed by utilizing two generally identically shaped shell members 14 and 16. Shell half or member 14 is an integrally formed member including two generally arcuately formed sections 18 and 20 connected by web 22 and having end projections 24 and 26, all shaped from one piece of stock. Shell half 16 is a similar formed member and includes generally arcuate sections 28 and 30 connected by web 32 and terminating in opposite end projections 34 and 36. To form motor sections 10 and 12, shell halves 14 and 16 are arranged with their arcuate portions 18, 20, 28 and 30 in opposed relationship. The opposed arcuate portions are complimentary and define armature receiving openings therebetween. It will be appreciated that shell halves 14 and 16 can be shaped in any conventional manner.

Field generating magnets of conventional construction are attached on the inner side of each motor section and are disposed in the armature openings formed in the motor sections. More specifically magnets 38 and 40 are connected in section 10 and magnets 42 and 44 are connected in motor section 12. In addition to providing the basic outer housing for the motor, the shell halves cooperate with the magnets in providing the field generating assembly for the motor sections in that the shell halves complete the magnetic circuit for the permanent magnets in generating the motor field. Armature assemblies 46 and 48 are positioned within motor sections 10 and 12 for cooperation with the magnets in a conventional manner. The actual mounting of the armature assemblies in the motor sections will be described hereinafter.

It has been found that the formed, complementary shell halves lend themselves particularly well to a simplified arrangement for connecting the magnets in the shell. More particularly, the arcuate sections of each of the shell halves are provided with a bumped-back indentation, indentation 50 being provided in arcuate section 18, 52 in section 20, 54 in section 28 and 56 in section 30. In each motor section these indentations are circumferentially spaced on the motor shell and project inwardly with respect to the armature opening to provide circumferentially spaced, generally radial extending surfaces. The magnets are wedged between the radial surfaces provided by the indentations in each motor section and are held against circumferential movement in the motor sections by the indentations. With reference to the drawing, magnets 38 and 40 are wedged between indentations 50 and 54 and magnets 42 and 44 are wedged between indentations 52 and 56.

Wedging of the magnets between the indentations will generally exert sufficient force to hold the magnets in position against axial and circumferential movement, however, in some applications it may be desirable to apply an epoxy cement between the magnets and the motor shells. Also, the motor shells can be provided with indentations (not shown) which are similar to indentations 50–56 but are axially oriented with respect to the motor shells and engage the axial ends of the magnets to hold the magnets against axial movement. The preferred arrangement is to provide only the indentations 50–56 and to rely on the wedging action of those indentations to hold the magnets in position as this provides the simplest and most readily fabricated construction.

A further advantage of the use of this particular arrangement for holding the magnets in position in the motor shells, namely the use of indentations 50–56, is that indentations can be arranged in diametrically opposed relationship in the motor sections. When so arranged, the indentations reduce the profile of the motor assembly and thereby reduce the amount of space required to accommodate the gang motor assembly. This is illustrated in FIG. 1 where it will be noted that the indentations in each motor section are aligned along a line generally normal to the extension of the shell halves. In many applications where the available space is limited, this lower profile offers significant advantages.

In FIG. 2 a further advantage of the use of the formed shell halves is illustrated. Conventional armature assembly 46 (and it should be noted that the following description will also apply to armature assembly 48 of motor section 12) is supported in motor section 10 by self-aligning bearings 62 and 64 carried on armature shaft 66. Bearing 62 is illustrated as supported in a conventional end cap assembly 68 and as being adjacent a conventional commutator and brush assembly 70. However, bearing 64 is not supported in a separate end cap assembly but is supported between bearing retainer surfaces 72 and 74 which are formed as an integral part of shell halves 14 and 16. More specifically, arcuate section 14 and 16 include semi-cylindrical portions 71 and 73 each terminating in an integrally formed end 75 and 77, both ends being formed as sections of a sphere so that when the arcuate sections are connected they form a generally closed semi-spherical end. Bearing retainer surfaces 72 and 74 are formed integrally with and project axially from ends 75 and 77 and each has a generally spherical surface. Surfaces 72 and 74 compliment each other so that when the shell halves are assembled they, together, form a generally spherical opening for receiving bearing 64. The bearing retainer and shaft support provided by surfaces 72 and 74 is a substantial simplification over the conventional bearing and shaft support. This can be seen from a comparison of the right and left hand ends of the motor section illustrated in FIG. 2. For example not only are the separate end cap and fasteners necessary to connect the end cap to the motor shell eliminated but also the need for bearing retainer spring 79 is eliminated.

In FIG. 3 motor section 10' is illustrated as having both ends provided with integrally formed ends and bearing retainer surface 72' and 74' and 76 and 78. Bearing retainer surfaces 72', 74', 76 and 78 in FIG. 3 are constructed in the identical manner of bearing surfaces 72 and 74 in FIG. 2, i.e. they are formed as integral projections from ends 75', 77', 70 and 82, which are in turn integral with the central, semi-cylindrical sections of arcuate sections 14' and 16'. The bearing retainer surfaces in FIG. 3 receive self-aligning bearings 64' and 84. With this arrangement the overall motor construction is simplified considerably as no separate attachment of additional end caps is required.

Also in FIG. 3 bearing retainer surface 76 is provided with an axial projection 86. This projection is formed integrally with bearing retainer surface 82 and affords increased versatility to the motor in that it will readily receive a flexible shaft retainer to permit the motor to drive through a flexible shaft if desired. More particularly, and with reference to FIGS. 3 and 4, projection 86 is arcuate in transverse cross section and includes an inner surface 88 and projection 90 spaced inwardly from its outer free end. A generally cylindrically flexible shaft retainer 92, having a circumferential bead 94 projecting from its outer surface, can be assembled in engagement with the inner surface 88 and with bead 94 engaged in projection 90. The connection of shaft retainer 92 to projection 86 can be completed by any conventional fastener such as a hose clamp 96. With this arrangement a flexible shaft 98 can be extended through retainer 92, which now will function in the nature of a bearing support for the shaft, and into a square opening 100 in the end of shaft 66'. Accordingly, in addition to being capable of use with any one of the conventional motor drives this motor construction is also readily adaptable to use in connection with a flexible shaft.

A problem commonly encountered in the assembly of motors is that, due to tolerance build-up or other factors encountered in fabricating the motor elements, the armature assembly when supported in its bearing retainers may have some end play. In conventional motor constructions the removal of this end play is a particularly troublesome problem and generally complicates motor assembly. Forming the motor shell with complimentary shell halves facilitates assembly and armature end play is readily eliminated. In this regard, bearing retainer surfaces 72' and 74' provide locating means whereby the armature assembly and shell halves are positioned with respect to each other. More particularly, armature assembly 46 with brush card assembly 70' and bearings 64' and 86 connected thereon can be placed in the lower shell half 16'. Should any end play exist the armature assembly can be removed from the shell half and washers 102, and 104 if desired, can be inserted between the self-aligning bearing and a shoulder 106, or 108, provided on the shaft for this purpose (see FIG. 6). The armature assembly is inserted and withdrawn until all end play is eliminated whereupon the upper shell half 14' is assembled over the armature to complete the motor assembly.

It was also discovered that with the use of the formed shell halves, particularly simplified motor mounts arrangements could be provided. More particularly, and with reference to FIG. 7, in forming shell halves 14' and 16' ends 75' and 77' thereof can also be formed with integral tabs 110 and 112 which, either before or after motor assembly is completed, can be turned as illustrated in FIG. 7, i.e. generally parallel to a radial plane through the arcuate sections. Fastener receiving holes 114 and 116 are provided in the tabs. These tabs provide means whereby motor section 10' can be mounted to a particular support structure. In a gang motor arrangement, similar tabs can be provided at each motor section to serve as mounting tabs. One or more of these mounting tabs can also be used to connect suitable attachments to the motor assembly to accommodate various types of attachments and drive mechanisms.

The motor section of FIG. 7 illustrates a different form of offset which can be provided in the arcuate shell half sections to position the magnets but still retain a surface which is offset radially inwardly from the remainder of arcuate section to define circumferentially spaced surfaces projecting inwardly of the armature assembly opening. In FIG. 7 the arcuate sections 18' and 28' are flattened at 111 and 113, this provides cordal surfaces the ends of which will engage and hold the magnets against circumferential movement in the motor shell.

It is also possible that in a gang motor assembly such as that which is illustrated in FIG. 11, motor sections 118, 120 and 122, which are formed of identical shell halves in the manner discussed in connection with FIG. 1, can be provided with square ends 124, 126 and 128 to accommodate a common end plate 130. This comon end plate is provided with suitable end cap bearing retainer portions 132, 134 and 136 to support the armature assemblies of each motor section. To connect the one-piece end plate to the motor sections the shell halves of motor sections 118 and 122 are provided with integrally formed tabs 138 and 140 turned parallel to the plane of ends 124, 126 and 128 of the motor sections, or to a radial plane, and include threaded apertures for receiving screws 142 and 144. This securely attaches the end plate to the motor section assembly. It will be appreciated that more than the two formed tabs illustrated in FIGS. 11 and 12 can be provided with equal facility on the motor sections. An advantage of the common end plate is that the connecting webs 146 and 148, which extend between the end cap portions of the respective motor sections, provide a convenient point of attachment for auxiliary mounting arrangements to accommodate a desired mounting application, for example mounts 150 and 152.

The connection between the formed shell halves can also be simply and conveniently established by use of turned tab connections, all of the elements of which can be integrally formed with the shell halves during fabrication of the shell halves. More particularly, and with reference to FIGS. 1, 8 and 9, projections 24 and 26 in shell half 14 have a greater outward or radial extension than projections 34 and 36 in shell half 16. In assembly the portions of projections or tabs 24 and 26 which extend beyond tabs 34 and 36 are turned over and under the tabs as illustrated in FIGS. 1 and 8. This provides a relatively simple and effective manner of holding the shell halves together. It will be appreciated that tabs 24, 26, 34 and 36 can be in the form of flanges extending completely around the motor sections or can have a limited extension in that direction with a number of sets of abutting tabs being provided around the entire joint between shell halves. To provide an inherent aligning feature in this connection, projections 34 and 36 can be provided with notches to receive projections 24 and 26. With reference to FIG. 9 the width of projection 34, and projection 36, is greater than the width of the projections 24 or 26 to which it is to be connected. In the instance of FIG. 9, projection 24 has a lesser width than 34 but is substantially equal to the width of slot 34a provided in projection 34. Projection 24 is turned into slot 34a and under projection 34 to both align the shell halves axially and connect the shell halves in their desired assembly relationship. It will be appreciated that the use of notch 34a, or a similar notch (not shown) in connection with projection 36, can be eliminated and the shell halves aligned in a suitable jig or fixture.

Brush card assembly 70 illustrated in FIG. 2 is mounted in a conventional manner, however, the formed shell halves are adapted to provide a more simplified and effective brush card holding arrangement. More particularly, the shell halves can be provided with spaced openings to receive projections on the brush card assembly. Preferably the openings are arranged in diametrically opposed relationship in the motor sections and receive diametrically opposed tabs provided on the brush card. With reference to FIGS. 3 and 7, shell halves 14' and 16' are provided with slots 154 and 156 and support backing 158 of brush card assembly 70' is provided with tabs 160 and 162 which project into the slots. Thus, when the shell halves are assembled, the brush card assembly is positively held between the shell halves and in the proper orientation with respect to the commutator. FIGS. 15 and 16 disclose an alternative brush card support arrangement but one which still utilizes formed openings in the shell halves. In this arrangement, projections 164 and 166 are provided in shell half 168 and projections 170 and 172 are provided in shell half 174. The projections are provided at the open end of the shell halves and the projections in one shell half compliment and mate with the projections in the other shell half to define, in the assembled motor section, inwardly facing openings 176 and 178. Tabs 180 and 182 of brush card 184 fit into these openings and hold the brush card in the motor assembly.

In many applications it is desirable that the motor be sealed against moisture. This can be readily achieved when using a motor shell constructed in accordance with this invention. With reference to FIG. 10, projections 186 and 188 can be made to extend generally coextensively along the shell halves and each is provided with an indentation 190 and 192 which cooperate in the assembled motor housing to provide an opening 194 for receiving a sealing compound 196, such as epoxy resin which functions both to seal and to connect the two shell halves together in the final assembly.

An alternative arrangement for mounting a magnet in the motor sections is illustrated in FIGS. 13 and 14. In this arrangement, each shell half is provided with a pair of projections 198 and 200 only a portion of one shell half 14" being illustrated as the other would be identical. These projections accommodate a suitable adhesive compound, such as an epoxy cement, which can be used to connect the magnets to the shell halves, e.g. epoxy 202 and magnet 204.

Due to tolerance build-up in the fabrication of the self-aligning bearings or fabrication of the shell halves, problems may be encountered in properly seating the self-aligning bearings between the formed bearing retainers (e.g. 72 and 74). FIG. 17 illustrates an improved arrangement for minimizing the effect of such tolerance variances and providing virtually universal interchangeability of bearings and shell halves. In this arrangement a tubular resilient member 206 is placed over bearing 208 and between the outer bearing surfaces and the inner surfaces of bearing retainers 210 and 212. The resilient member accommodates variations between the confronting surfaces while holding the bearings securely in the motor assembly. Where a sealed motor shaft is desired this arrangement is also readily adaptable to provide a shaft seal. More particularly, the resilient member can be provided with an extension which terminates in an opening 216. Opening 216 is smaller in diameter than armature shaft 218 and will securely engage the shaft to provide a sealed connection while leaving the shaft relatively free for rotation.

Although this invention has been illustrated and described in connection with particular embodiments thereof, it will be apparent to those skilled in the art that various changes and modifications may be made therein without departing from the spirit of the invention or from the scope of the appended claims.

We claim:

1. In a motor assembly, a motor shell comprising, in combination, first and second formed motor shell sections each including a plurality of arcuate generally semi-cylindrical portions, means connecting said first and second motor shell sections with said arcuate portions in opposed relationship to define openings therebetween for receiving armature assemblies, means at one end of said semi-cylindrical portions integrally formed with and extending from each of said semi-cyclindrical portions of said motor shell sections in a generally radial direction and, when said motor shell sections are connected, cooperating to provide substantially closed ends for said motor shell, means integrally formed with said closed end providing means on each of said motor sections which, when said motor shell sections are connected, complement each other to form bearing receiving openings therebetween, an armature assembly disposed in each of said armature receiving openings and including bearings engaged in said bearing receiving openings, means on one of said bearing surfaces defining a surface extending axially outwardly from said bearing receiving opening and including means for receiving a flexible shaft, and flexible shaft retaining means engaged with said last-mentioned means.

2. In a motor including a motor shell and an armature assembly in said shell and including an armature shaft, the combination of support means in said motor shell for said armature assembly and including means defining bearing receiving surfaces in said motor shell, bearing means on said shaft and arranged at said bearing receiving surfaces, and resilient, deformable means disposed between said bearing receiving surfaces and said bearing means providing a secure seat for said bearing means in said motor shell.

3. A motor assembly including a plurality of motor sections and an armature assembly arranged for rotation within each of said motor sections, said motor assembly comprising, first and second motor shell sections each including relatively spaced arcuate portions connected by web portions formed integrally with an extending between adjacent arcuate portions, means connecting said first and second motor shell sections with said arcuate portions in opposed relationship, said opposed arcuate portions being complementary and defining an opening therebetween for receiving an armature assembly, means defining offset portions in each of said arcuate portions and spaced around the periphery defined by said connected opposed arcuate portions, said offset portions projecting inwardly with respect to said armature assembly receiving openings, magnet means arranged in each of said armature assembly receiving openings between adjacent ones of said offset portions, said arcuate portions each having a generally semi-cylindrical extension terminating in opposite ends, at least one end of each arcuate portion having a configuration generally in the form of a section of a sphere, said spherical section ends of opposed arcuate portions also arranged in opposed relationship when said motor shell sections are connected and being complementary to define a generally semi-spherical end for said motor shell sections, each of the spherical section ends including an axially extending bearing extension having a configuration generally in the form of a section of a sphere, the bearing extensions of each motor shell section being arranged in opposed relationship when said motor shell sections are connected to define a generally spherical bearing retaining opening therebetween, bearing retaining means at the opposite end of each of said motor shell sections, one of said bearing extensions including an additional integrally formed projection extending axially outwardly of said bearing retaining opening and including means for receiving a flexible shaft retainer, and said armature assemblies each including an armature shaft and self-aligning bearings arranged on said shaft and engaged in the bearing retaining opening and bearing retaining means of each of said motor sections.

References Cited

UNITED STATES PATENTS

| | | | |
|---|---|---|---|
| 3,107,946 | 10/1963 | Drake | 308—8 |
| 2,139,012 | 12/1938 | Gillen. | |
| 2,971,107 | 2/1961 | Jin | 310—258 |
| 3,167,672 | 1/1965 | Tupper | 310—90 |
| 3,165,654 | 1/1965 | Mabuchi | 310—46 |
| 565,530 | 8/1896 | Mayer | 310—112 |

J D MILLER, Primary Examiner

G. P. TOLIN, Assistant Examiner

U.S. Cl. X.R.

310—40, 66, 114, 154

UNITED STATES PATENT OFFICE
CERTIFICATE OF CORRECTION

Patent No. 3,510,707 May 5, 1970

Thomas W. Stone et al.

It is certified that error appears in the above identified patent and that said Letters Patent are hereby corrected as shown below:

Column 7, line 21, "tegrally formed with" should read -- trgral with --; line 28, "means integrally formed with" should read -- means integral with --; line 14, "formed" should read -- deformed --; line 47, after "shell" insert -- said bearing receiving surfaces being generally tubular in the direction of the axis of said shaft --; same column 7, line 53, the period should be a comma (,) and the following should appear as the last paragraph in that claim:

and said armature shaft projecting externally of said motor shell at one set of said bearing receiving surfaces said resilient means also extends exteriorly of said motor shell and surrounds and sealingly engages a portion of said shaft.

Column 7, line 49, cancel "and"; line 50, after "means" insert -- having a generally tubular configuration in said axial direction and --. Column 8, line 1, "formed integrally with" should read -- integral with --; line 35, "integrally formed projection" should read -- integral projection --.

Signed and sealed this 16th day of February 1971.

(SEAL)
Attest:

EDWARD M. FLETCHER, JR.
Attesting Officer

WILLIAM E. SCHUYLER, JR.
Commissioner of Patents